United States Patent [19]

Gandy

[11] Patent Number: 4,733,935
[45] Date of Patent: Mar. 29, 1988

[54] SYMMETRICAL CONNECTOR FOR OPTICAL FIBER CABLES IN A HOSTILE ENVIRONMENT

[75] Inventor: Ronald L. Gandy, Culpeper, Va.

[73] Assignee: The Rochester Corporation, Culpeper, Va.

[21] Appl. No.: 699,550

[22] Filed: Feb. 8, 1985

[51] Int. Cl.$^4$ .............................................. G02B 6/38
[52] U.S. Cl. ........................... 350/96.21; 350/96.20
[58] Field of Search .......................... 350/96.20, 96.21

[56] References Cited

U.S. PATENT DOCUMENTS

| | | | |
|---|---|---|---|
| 4,573,760 | 3/1986 | Fan et al. | 350/96.21 |
| 4,601,536 | 7/1986 | Guazzo | 350/96.21 |
| 4,606,603 | 8/1986 | Cairns | 350/96.21 |
| 4,607,911 | 8/1986 | Rhodes | 350/96.21 |

*Primary Examiner*—William L. Sikes
*Assistant Examiner*—Robert E. Wise
*Attorney, Agent, or Firm*—Lorusso & Loud

[57] ABSTRACT

A connector for the splicing of the individual filaments of an optical fiber cable to the filaments of another cable, or to a related component, particularly in a hostile environment as when the cables are under water, includes a cylindrical outer housing within which are received several elements for anchoring two cables and splicing the filament within a protected space in the housing, all of the elements being designed to form a generally cylindrical assembly that can be inserted into, and removed from, the outer housing from either end to provide the protected inner space and being equipped with O-ring fluid seals to prevent unwanted leakage of liquid from the exterior of the housing into that space. In one form of the invention, axially slidable compensating pistons are provided at the opposite ends of the protected interior space to equalize the pressure between the interior space and the exterior of the housing. In both forms of the invention it is structurally symmetrical with respect to a central transverse plane to permit reversal of the components within the housing, including the use of substantially identical removable elements on opposite sides of the central plane.

28 Claims, 3 Drawing Figures

SYMMETRICAL CONNECTOR FOR OPTICAL FIBER CABLES IN A HOSTILE ENVIRONMENT

BACKGROUND OF THE INVENTION

This invention relates to optical fiber cables, and more particularly to a connector for the joining of the optical fiber filaments of a bundle of fibers carried by one cable to the fibers carried by another cable or may be joined to a related component, such as a repeater, by simple splicing means for protection against the elements such as weather conditions or against conditions such as are encountered by underwater cables.

There are a large number of connectors known for joining optical fiber cables together, but in most cases, they are composed of complex arrangements of many individual elements, each element or assembly of elements usually performing only a single function.

Other types of connectors are constructed in such a manner that the elements connected to one cable are not interchangeable with the elements connected to the other cable so that care must be taken to select the proper subassembly to be attached to each cable termination.

In other cases, specially designed splicing devices are required for the joining of individual optical fiber filaments which must be used with the particular mechanism provided for anchoring the two cables carrying the respective bundles of fibers.

The foregoing characteristics are particularly evident in known connectors of the type designed for underwater use where a liquid is contained within the connector space where the filaments are spliced and compensating means is provided for equalizing the pressure within the inner space with pressure of the liquid surrounding the connector.

Examples of known connectors are disclosed in the following U.S. Pat. Nos. 4,192,569; 4,172,212; 3,742,427; 3,571,783 and 3,508,188.

SUMMARY OF THE INVENTION

The invention provides a connector for optical fiber cables which is simple in construction, for use in normal condition or submerged under water wherein a tubuler, or cylindrical housing within which is inserted from either end a symmetrical cage assembly to which each of the cables are anchored, the cage assembly defining at least one space within the housing for the direct splicing of the fiber filaments or to contain a related component to which the fibers are joined.

A feature of the invention is that the cage assembly may be secured in place by identical end closures which can be removed to allow removal of the cage assembly for inspection of the fibers and components contained within the space in the housing without disconnecting the fibers.

A further feature is that the cage assembly is generally tubular, or cylindrical, to conform to the cross-section of the housing, and includes axially spaced O-ring seals to prevent transfer of fluid between the interior space the outside of the housing.

In one form of the invention axially slidable pistons are provided within the housing and the cage assembly to equalize the pressure of a fluid within the interior space and the exterior of the housing.

The cage assembly may also contain a transverse bulkhead to provide two fluid sealed interior spaces for the terminations of the cables so that the individual cables can be separated from each other. In this embodiment one of the compensating pistons can remain in place to equalize the pressure between the space containing the remaining cable on one side of the bulkhead and the pressure of exterior fluid acting directly on the other side of the bulkhead.

DETAILED DESCRIPTION OF THE INVENTION

Figure 1:
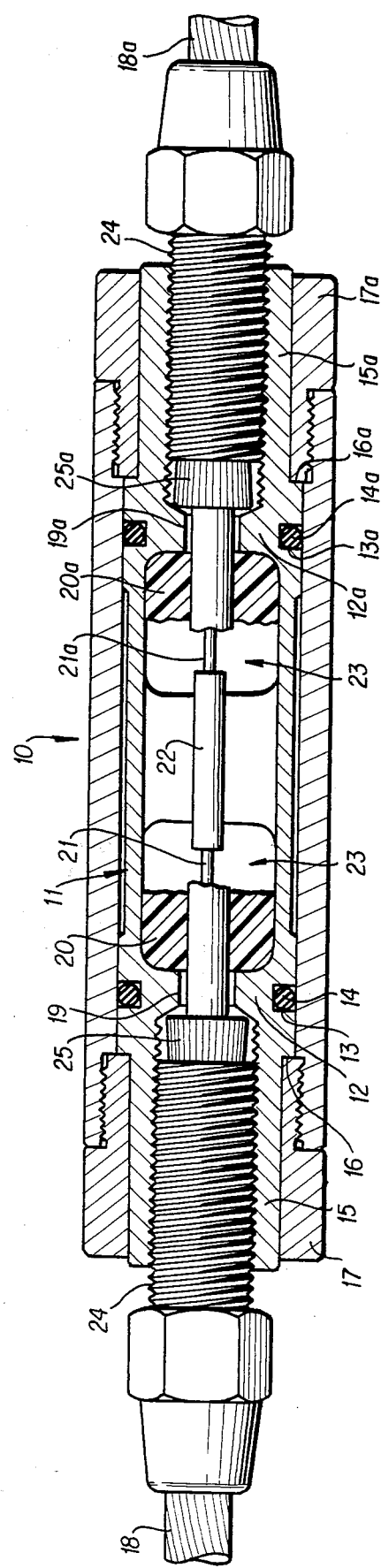
FIG. 1 is an elongated cross-sectional view of one form of symmetrical connector for optical fiber connectors according to the invention which may be used in any environment including underwater application.

One form of connector for optical cables as shown in FIG. 1, in which there is shown an elongated cylindrical outer housing 10, within which there is contained an inner generally tubular member, indicated by numeral 11 which is slidably received in the housing 10 from either end. The inner member is provided with a pair of axially spaced transverse circular walls 12 and 12a, and the external peripheral surface of member 11 is provided with annular grooves 13 and 13a, generally in axial alignment with walls 12 and 12a, and elastomeric O-ring fluid seals 14 and 14a are inserted into the grooves to prevent the transfer of fluid between the space in the housing between walls 12 and 12a and the exterior of housing 10.

At each end of inner member 11 there are axially outwardly projecting cylindrical extensions 15 and 15a of slightly smaller outer diameter to provide the radially projecting flanges 16 and 16a, which abut against the inner ends of the hollow cap members 17 and 17a which closely encircle the projections 15 and 15a when threadedly attached to the respective opposite ends of housing 10 to secure member 11 in place.

Optical fiber cables 18 and 18a are introduced into the center of the connector through the respective extensions 15 and 15a and are passed through bores 19 and 19a in the walls to be bonded to the walls 12 and 12a by an adhesive material such as polyurethane or epoxy or similar composition, as indicated at 20 and 20a, to form a fluid seal between the cables and the respective inner walls. The optical fiber filament, or filaments, 21 and 21a, of the cables extend out from the ends of the cables to be connected to a component, such as a repeater (not shown) or to be joined in abutting relationship in conventional manner, as by means of a splicer 22. Portions of the cylindrical wall of number 11 are cut away, as at 23, to provide access to the interior space in order to manipulate the terminal ends of the cables 18 and 18a and fibers 21 and 21a.

While the adhesive bond provided by the adhesive 20 and 20a may be sufficient to anchor the cables to the connector under certain conditions, it is preferable to provide the mechanical compression assemblies which include the respective elongated hollow threaded bolts 24 and 24a and tapered hollow compression members 25 and 25a which should be slipped on the cables before they are introduced into the extensions 15 and 15a. A portion of the axial length of members 25 and 25a is received between each cable and an inner end of bolts 24 and 24a and the inner ends of members 25 and 25a abut against the connically flanged areas 26 and 26a surrounding bores 19 and 19a so that as bolts 24 and 24a are tightened an increasing gripping force is exerted on the cables 18 and 18a.

It should be particularly noted that the entire connector assembly is symmetrical in both axial directions as viewed from the center which results, not only in simplicity of construction, but also in ease and convenience of assembly. For example, since the housing 10 and inner member are cylindrical and are of uniform diameters along the lengths, not only can the inner member be introduced into housing 10 from either end of the housing, but it is immaterial which end of the inner member is presented when fitted into the housing. Furthermore, such removable elements as the caps 17 and 17a, bolts 24 and 24a and compression members 25 and 25a are, respectively, of substantially identical configuration so that it is immaterial, when assembling the connection, which of the respective elements is used at each end of the connector. The space between the walls 12 and 12a may be filled with a protective liquid when the inner member 11 is being inserted into the outer housing.

Figure 2:
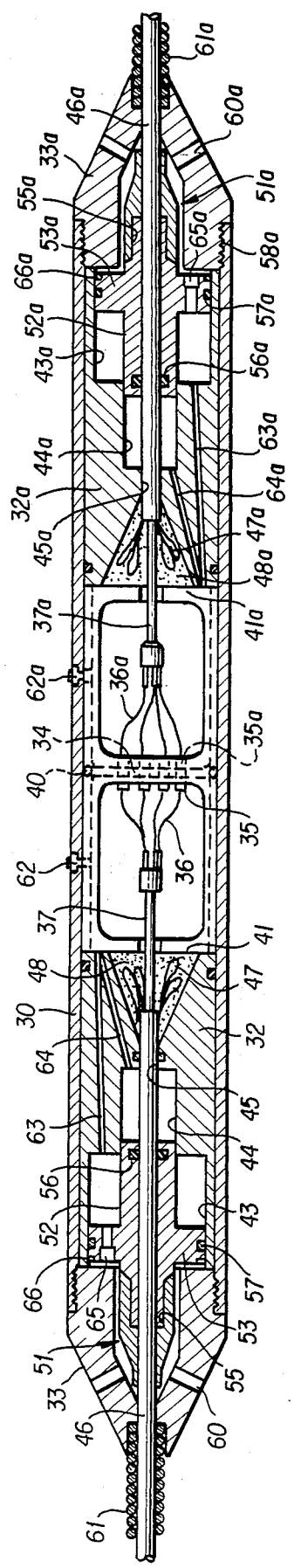
FIG. 2 is a cross-sectional view of a modified form in which pressure equalization is provided between the inside and outside of the convertor even when only one of the two cables is in place.
Figure 3:
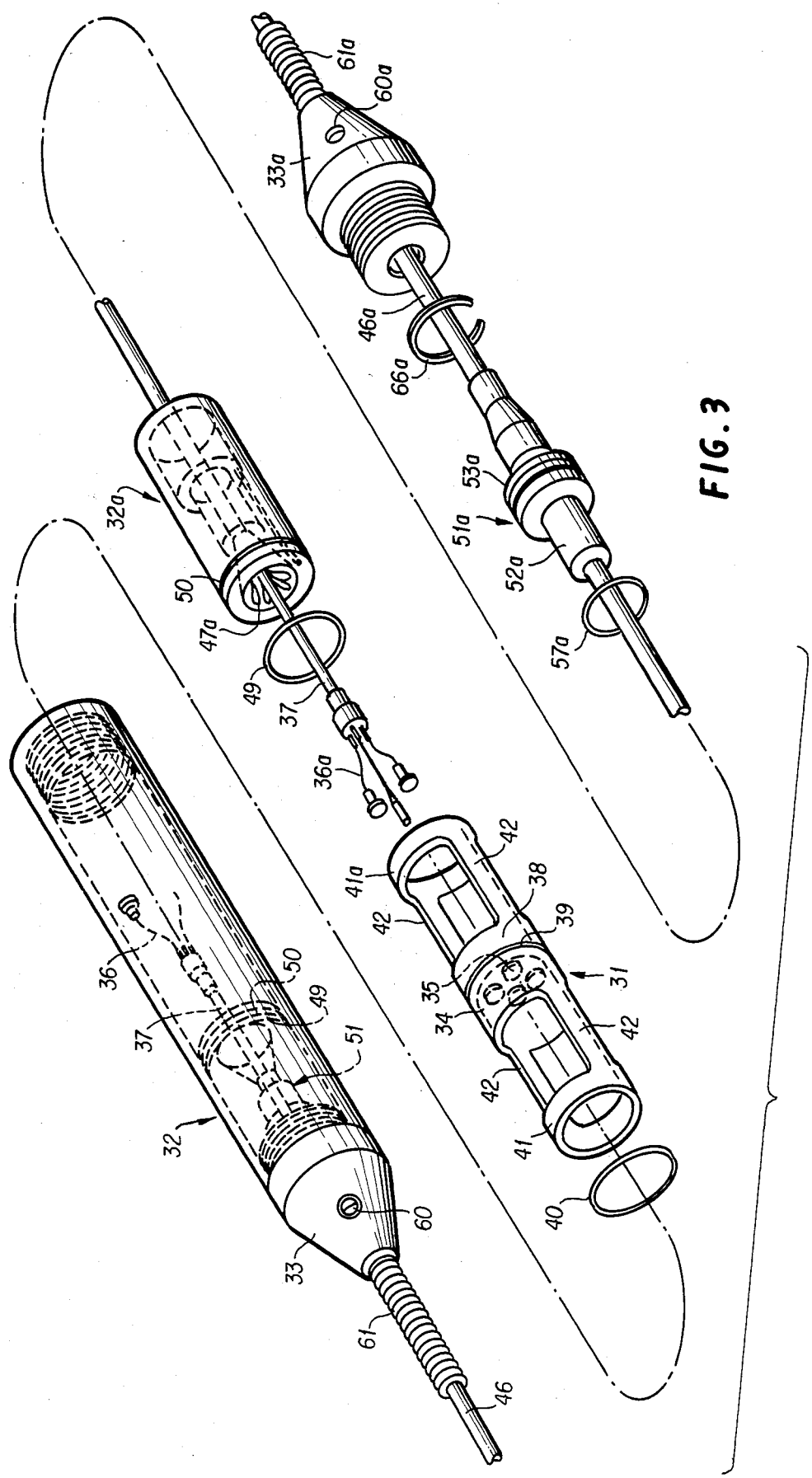
FIG. 3 is an exploded view of the assembly of components shown in FIG. 2.

The modification of the connector shown in FIGS. 2 and 3 is intended primarily for underwater use and is provided with means for equalizing the pressure between a liquid contained within the interior space where the optical filaments are spliced, or joined to another component such as a repeater, and the pressure of the water without which the connector is submerged. In addition, such pressure equalization is maintained even if one of the cables is temporarily disconnected and removed from the connector.

As in the form shown in FIG. 1, the connector of FIGS. 2 and 3 comprises an elongated outer cylindrical housing 30, into which there is inserted an inner assembly which comprises a generally cylindrical, centrally positioned cage element 31, a pair of substantially identical, but oppositely disposed, cylindrical cable anchoring and pressure equalizing assemblies 32 and 32a abutting respectively against the opposite ends of cage element 31 and a pair of substantially identical closure cap assemblies 33 and 33a, removably threaded to the respective ends of housing 30 to abut against the outer ends of the assemblies 32 and 32a.

The cage element 31 is essentially a thin-walled shell to support a transverse disc-shaped centrally located bulkhead 34 provided with a number of sockets 35 for removably joining the optical fiber filaments 36 of a fiber bundle 37 to the filaments 36a of another bundle of fibers 37a. The bulkhead 34 is encircled by a short length 38 of the cylindrical cage element which is provided with an annular groove 39 to receive an elastomeric fluid sealing O-ring 40 which effectively prevents any transfer of fluid along the length of housing 30 from one side of bulkhead 34 to the other. The cage element is completed by a pair of axially spaced cylindrical end sections 41 and 41a which are joined to the center section 38 by an appropriate number of longitudinally extending ribs 42 in order to provide openings in the cage element to permit access for manipulating the optical fiber filaments 36 and 36a.

The assemblies 32 and 32a are of substantially identical construction formed preferably from cylindrical blocks of suitable metal, such as steel, and provided with stepped axial bores of decreasing diameter 43, 44 and 43a, 44a in alignment with a narrow passage 45 and 45a through which the respective cables 46 and 46a pass to enter a cavity 47 and 47a within which the armor wires of the cables are stripped back and anchored by suitable adhesive material 48 and 48a which assists in preventing entry of exterior fluid through the passages 45 and 45a. To further complete the undesired entry of exterior fluid into the spaces defined by the cage element 31 the elastomeric O-ring seals 49 and 49a are received in annular grooves 50 and 50a.

Within the stepped bores 43, 44 and 43a, 44a there are axially slidable compensator pistons, indicated generally by numerals 51 and 51a, having an elongated portion 52 and 52a, sliding in bores 44 and 44a and an enlarged portion 53 and 53a disposed in the bores 43 and 43a. Extending outwardly from the enlarged portion is an elongated guide portion 54 and 54a while an axial bore 55 and 55a extends through the entire length of each piston to permit the cables 46 and 46a to extend therethrough. Preferably the armor wires of the cables are provided with a smooth exterior plastic coating and each of the pistons is provided with an elastomeric O-ring fluid seal 56 and 56a fitted into appropriate internal annular grooves to prevent transfer of fluid from one side of the piston to the other through the central bore. Elastomeric O-ring seals 57 and 57a are also fitted into external annular grooves in the respective larger piston portions 53 and 53a.

The end closure cap assemblies 33 and 33a are provided with threads 58 and 58a for removable attachment to the respective ends of housing 30 and their inner ends include cavities 59 and 59a which loosely encircle the outer projecting ends of the compensator pistons. Ports 60 and 60a allow fluid surrounding the housing to enter the ends of the housing to exert pressure on the outer ends of the respective compensator pistons 51 and 51a when the caps are in place and coiled wire strain relief members 61 and 61a may be attached to the ends of the caps where the cables 46 and 46a pass into the housing.

Pressure of the exterior fluid acting on the outer ends of the pistons 51 and 51a is opposed by fluid within the two interior spaces in the housing defined by the bulkhead 34. If the connector is to be used with underwater cables, a liquid compatible with the optical fibers and cables is used and this liquid can be introduced into the respective spaces through fill ports 62 and 62a provided in the housing 30. Liquid so introduced passes into the stepped bores 43 and 44 through passages 63 and 64 to exert pressure on the inner end of piston 51 and into stepped bores 43a and 44a through passages 63a and 64a to exert pressure on the inner end of piston 51a. To eliminate any gas pockets in the liquid the pistons are provided with respective bleed ports 65 and 65a. Since access to these bleed ports requires the temporary removal of the end caps, the C-shaped retainer rings 66 and 66a, which snap into grooves in the housing are provided to prevent axial displacement of the compensator assemblies when the end caps are removed and the process of filling the interior space is to be accomplished.

I claim:

1. A connector for joining optical fiber cables together, and to related components, comprising an assembly of elements which includes:

a tubular outer housing open at both ends; an inner member slidingly received in said housing from either end;

said inner member having an axial bore to receive one of said cables to introduce an optical fiber into a space within the housing;

means for anchoring said cable to said inner member and for sealing engagement between said cable and inner member to prevent entry of fluid into the inner space, through said bore;

sealing means between said inner member and housing to prevent entry of fluid into the inner space through the peripheral space therebetween;

a free piston means in said axial bore for equalizing pressure between said inner space and the exterior of said connector;

removable cap means secured to one end of the housing to prevent removal of the inner member from said one end, and;

removable closure means for the other end of the housing including sealing and anchoring means for another cable to introduce an optical fiber from said another cable into said inner space and to prevent entry of fluid into said inner space from said other end.

2. The invention defined in claim 1, wherein said inner member includes a transverse wall provided with said axial bore, said cable being secured to the transverse wall by adhesive material.

3. The invention defined in either one of claims 1 or 2, wherein sid sealing means between the inner member and outer housing comprises an elastomeric ring disposed in a circumferential groove in said inner member.

4. The invention defined in either one of claims 1 or 2, wherein a tubular cone-shaped compression member surrounding said cable is disposed in said bore, said bore having an inwardly flanged portion against which the larger end of said cone-shaped member abuts, and an elongated hollow screw element is threaded into said bore surrounding said cable and a portion of the smaller end of the compression member for securing the cable to the inner member.

5. The invention defined in either one of claims 1 or 2, wherein said inner member is provided with two axially spaced transverse walls defining said space within the outer housing, each of said walls being provided with an axial passage to admit fiber optic cables into the space from opposite ends of the housing, and means for fluid-sealing and securing engagement between the cables and the inner member and for fluid-sealing engagement between the inner member and outer housing to prevent entry of fluid into said inner space.

6. The invention defined in claim 5, wherein said fluid-sealing engagement includes a pair of elastomeric elements disposed in axially spaced circumferential grooves provided in the exterior of the inner member.

7. The invention defined in claim 1, wherein said free piston means comprises:
an axially slidable piston;
a first conduit means between one side of said piston and said inner chamber;
a second conduit means between the outer side of said piston and the exterior of said outer housing; and
means for preventing the transfer of fluid between said inner chamber and the other end of said outer housing.

8. The invention defined in claim 7, wherein said piston is axially slidable in said bore and is provided with a central passage for said cable and elastomeric fluid sealing means between said passage and cable.

9. The invention defined in claim 8, wherein said outer housing is provided with a port having a removable closure, for introducing fluid into the inner chamber.

10. The invention defined in claim 9, wherein said second conduit means includes a port provided in said cap means in communication with the fluid surrounding the outer housing.

11. The invention defined in claim 10, wherein the diameter of a portion of the axial length of said bore is reduced with respect to the diameter of the remaining axial length of the bore, said piston along its axial length having portions of unequal diameters corresponding to said bore diameters, said first conduit means being in communication with both portions of the bore, and elastomeric fluid sealing means between the larger diameter portion of the piston and bore.

12. The invention defined in either one of claims 10 or 11, wherein a cage member is also slidingly received within said outer housing from either end thereof to be positioned between said inner member and the removable closure means for the other end of the outer housing, said cage member including a medially disposed transverse bulkhead dividing the inner space into two axially adjoining chambers and having means for joining fiber optic filaments disposed on opposite sides of the bulkhead, and fluid sealing means between the inner cage member and outer housing to prevent exchange of fluid between said chambers.

13. The invention defined in claim 12, wherein said outer housing is provided with a pair of axially spaced parts having removable closure means for the selective introduction of fluid into each of said chambers for equalization of fluid pressures within and without said chambers.

14. The invention defined in claim 13, wherein said pistons are provided with bleed ports for controlling the volume of fluid contained within the outer housing.

15. In a connector for joining the fiber optic filaments of two fiber optic cables, the combination comprising:
a cylindrical outer housing:
an elongated generally tubular internal cage member slidably received within the outer housing from either end;
said cage member having a pair of axially spaced circular transverse walls to define a chamber within said housing, each of the walls being provided with a passage to permit entrance of fiber optic filaments from each cable into said chamber;
a free piston means for equalizing pressure between said chamber and the exterior of said connector;
at least a portion of the tubular surface of the cage member between said walls being open to permit access to said filaments within the chamber;
a pair of axially spaced circular elastomeric fluid sealing means disposed in the space between the cape member and outer housing to prevent entry of fluid into said chamber through said space;
said cage member being provided at its opposite ends with means to secure a fiber optic cable to the cage member, and;
tubular removable cap members for the respective opposite ends of the outer housing to hold the cage member in place within the housing.

16. The invention defined in claim 15, wherein the opposite ends of said cage member are provided with axially outwardly projecting sleeve portions to be received within the respective tubular cap members, the inner ends of each of the sleeve portions including a radially outwardly projecting flange for abutment with the respective inner ends of the cap members.

17. The invention defined in claim 16, wherein the interior wall of each of the sleeve portions are threaded to receive a hollow externally threaded bolt surrounding a respective one of each of the cables, and cable-gripping means coacting with each of the bolts to secure a cable to the cage number.

18. The invention defined in claim 17, wherein said cable-gripping means comprises a tapered hollow element surrounding a cable and partially received within said hollow threaded bolt.

19. The invention defined in any one of claims 15, 16, 17 or 18, wherein said cage member includes a transverse support for optical fiber splicing means.

20. A pressure compensated connector assembly for joining optical fiber cables together and to related components in a hostile fluid environment, comprising:
   a cylindrical housing;
   an axially elongated inner cage element provided with a medially located circular bulkhead to be slidingly inserted into the housing from either end said bulkhead dividing a space in said housing into two axially aligned chambers;
   elastomeric sealing means engageable between the housing and the cage element to prevent transfer of a fluid confined in the housing on opposite sides of the bulkhead from one side of the bulkhead to the other side thereof;
   said bulkhead including means for sealingly joining optical fiber filaments on one side of the bulkhead to filaments on the other side there;
   a pair of substantially identical closure and pressure equalizing assemblies to be removably attached to the respective opposite ends of the housing for (a) positioning the inner cage element, (b) selectively securing a pair of optical fiber cables to the housing and (c) equalizing the pressure between a fluid within which the housing is submerged and the pressures of said fluid confined in the housing on both sides of said bulkhead when the closure assemblies are in place and when either one of the assemblies is removed; and
   said closure and pressure equalizing assemblies includes a piston contained within the housing slidable in a box, and conduit means communicating between one side of the piston and the fluid in one of said chambers and communicating between the other side of the piston and the fluid within which the housing is submerged.

21. The invention defined in claim 20, wherein each of said closure and pressure equalizing assemblies comprises a cylindrical pressure equalizing sub-assembly to be slidably received within the housing in alignment with one end of the inner cage element and a closure out-assembly to be removably attached to one end of the housing, an optical fiber cable being bonded by adhesive material to one of said sub-assemblies.

22. The invention defined in claim 21 wherein each of said pressure equalizing sub-assemblies includes an axial passage for the optical fiber cable and a piston member axially slidable in said passage, said piston member also having an axial passage through which the cable passes and elastomeric fluid sealing means between the exterior of the cable and the passage in the piston member to allow slidable movement of the piston member.

23. The invention defined in claim 22, wherein the diameter of said piston member along a portion of its length is of one diameter and along a succeeding portion of a substantially enlarged diameter, the diameter of an inner portion of the passage conforming to said one diameter, the diameter of the outer portion of the passage conforming to said enlarged diameter.

24. The invention defined in claim 23, wherein said cylindrical sub-assembly is also provided with fluid passage means communicating between one of the chambers defined by said inner cage element and both the inner end of the piston member and the inner side of the enlarged portion thereof, and elastomeric fluid sealing means between the enlarged portion of the piston member and said enlarged portion of the passage.

25. The invention defined in either one of claims 22, 23 or 24, wherein said piston member is provided with an axially outwardly projecting guide portion of reduced diameter and each of said closure sub-assemblies comprises a cap provided with a passage for the optical fiber cable removably secured to the end of the cylindrical housing, the inner portion of the passage in the cap being enlarge to loosely receive said guide portion of the piston member, the inner end of the cap abutting against one end of the pressure equalizing assembly, the other end of the latter sub-assembly abutting against one end of the cage element, and elastomeric fluid sealing means between the latter sub-assembly and the inner wall of the cylindrical housing.

26. The invention defined in claim 25, wherein each of said caps is provided with a port for fluid transfer between the outer end of the piston member and the space surrounding the housing.

27. The invention defined in any one of claims 22, 23 or 24 wherein said housing is provided with filler ports for introducing fluid selectively into each of said chambers defined by the cage element and each of said piston is provided with a bleed port for selectively removing excess fluid from each of said chambers.

28. A connector for splicing the fiber optical filaments of a pair of optical fiber cables in a hostile environment, comprising:
   a cylindrical housing of substantially uniform diameter along its length;
   a removable assembly of components to be inserted into said housing for anchoring the terminal ends of a pair of optical fiber cables within said housing in fluid sealed relationship thereto and for defining a fluid sealed space within the housing for joining the fiber optical filaments of said cables to each other or to a related component;
   said assembly of components being structurally symmetrical along its length leading away in opposite directions from a central transverse plane, whereby said assembly may be inserted into the housing from either end thereof and may be reversibly positioned therein, and;
   a pair of substantially identical removable end caps for locking said assembly in position in the housing and to permit said assembly to be readily inserted into, and removed from, either end of the housing.

* * * * *